US011745149B2

(12) United States Patent
Nakamoto

(10) Patent No.: US 11,745,149 B2
(45) Date of Patent: Sep. 5, 2023

(54) FINE BUBBLE GENERATING APPARATUS, FINE BUBBLE GENERATION METHOD, SUCTION DEVICE, AND SUCTION SYSTEM

(71) Applicant: TECH CORPORATION CO., LTD., Hiroshima (JP)

(72) Inventor: Yoshinori Nakamoto, Hiroshima (JP)

(73) Assignee: TECH CORPORATION CO., LTD., Hiroshima (JP)

( * ) Notice: Subject to any disclaimer, the term of this patent is extended or adjusted under 35 U.S.C. 154(b) by 514 days.

(21) Appl. No.: 16/320,373

(22) PCT Filed: Jul. 24, 2017

(86) PCT No.: PCT/JP2017/026633
§ 371 (c)(1),
(2) Date: Jan. 24, 2019

(87) PCT Pub. No.: WO2018/021217
PCT Pub. Date: Feb. 1, 2018

(65) Prior Publication Data
US 2019/0240629 A1 Aug. 8, 2019

(30) Foreign Application Priority Data

Jul. 24, 2016 (JP) .................................. 2016-144996
Jun. 14, 2017 (JP) .................................. 2017-116388

(51) Int. Cl.
*B01F 23/20* (2022.01)
*C02F 1/461* (2023.01)
(Continued)

(52) U.S. Cl.
CPC .............. *B01F 23/20* (2022.01); *B01F 25/00* (2022.01); *B01F 25/20* (2022.01); *C02F 1/46* (2013.01);
(Continued)

(58) Field of Classification Search
CPC .. B01F 3/04; B01F 5/00; B01F 5/0057; B01F 5/02; B01F 3/04248; C02F 1/46;
(Continued)

(56) References Cited

U.S. PATENT DOCUMENTS 4,556,523 A 12/1985 Lecoffre et al.
6,382,601 B1 * 5/2002 Ohnari ................... B01F 23/232
261/123
(Continued)

FOREIGN PATENT DOCUMENTS

CN 1092478 A 9/1994
JP 34-21391 Y 12/1959
(Continued)

OTHER PUBLICATIONS

EPO translation of Tomoyuki et al. JP2011217785 published Nov. 4, 2011 (Year: 2011).*
(Continued)

*Primary Examiner* — Stephen Hobson
(74) *Attorney, Agent, or Firm* — Sughrue Mion, PLLC

(57) ABSTRACT

[Problem] To enable an increase of fine bubbles in medium liquid.
[Solution] A suction device of the present invention includes a cylindrical portion that is formed of a cylinder with two base surfaces, first surface and second surface, and that flows medium liquid supplied from a plurality of paths, from the first surface toward the second surface, a plurality of introducing portions that introduce the medium liquid from the first surface or from the vicinity of the first surface into the cylindrical portion such that the medium liquid swirls inside the cylindrical portion, and an outlet port provided at or in the vicinity of the center of the second surface.

9 Claims, 13 Drawing Sheets

(51) Int. Cl.
*C02F 1/46* (2023.01)
*B01F 25/00* (2022.01)
*B01F 25/20* (2022.01)

(52) U.S. Cl.
CPC ........ *C02F 1/461* (2013.01); *C02F 2301/024* (2013.01); *C02F 2301/026* (2013.01); *C02F 2301/028* (2013.01); *C02F 2303/26* (2013.01)

(58) Field of Classification Search
CPC ............... C02F 1/461; C02F 2301/028; C02F 2301/024; C02F 2301/026; C02F 2303/26; C02F 1/46104
See application file for complete search history.

(56) References Cited

U.S. PATENT DOCUMENTS

| | | | |
|---|---|---|---|
| 6,878,268 B2* | 4/2005 | Sawada | C02F 9/00 205/745 |
| 7,472,893 B2* | 1/2009 | Ohnari | B01F 25/4412 261/108 |
| 7,997,563 B2* | 8/2011 | Abe | B01F 5/0665 261/78.2 |
| 8,771,524 B2* | 7/2014 | Vorage | B01J 19/24 210/512.1 |
| 8,991,796 B2 | 3/2015 | Yoko | |
| 2007/0284245 A1* | 12/2007 | Hegel | C02F 1/4672 204/280 |
| 2014/0083845 A1* | 3/2014 | Han | B01F 25/4521 204/273 |
| 2014/0116889 A1* | 5/2014 | Nakamoto | C25B 9/19 205/556 |
| 2016/0029602 A1* | 2/2016 | Nakamoto | A01K 43/005 134/56 R |
| 2016/0346758 A1* | 12/2016 | Kress | C01B 3/06 |
| 2020/0055009 A1* | 2/2020 | Galaka | B01F 25/1042 |

FOREIGN PATENT DOCUMENTS

| | | | |
|---|---|---|---|
| JP | 56-39121 U | | 4/1981 |
| JP | S5639121 | * | 4/1981 |
| JP | S60-054725 A | | 3/1985 |
| JP | 2001-276589 A | | 10/2001 |
| JP | 2003-262366 A | | 9/2003 |
| JP | 2003-275555 A | | 9/2003 |
| JP | 2008-168168 A | | 7/2008 |
| JP | 2008-279350 A | | 11/2008 |
| JP | 2009-247990 A | | 10/2009 |
| JP | 4563496 B2 | | 10/2010 |
| JP | 4652478 B1 | | 3/2011 |
| JP | 2011-88079 A | | 5/2011 |
| JP | 2011-121002 A | | 6/2011 |
| JP | 2011217785 | * | 11/2011 |
| JP | 2013-81880 A | | 5/2013 |
| JP | 2015-100735 A | | 6/2015 |
| JP | 2015-205225 A | | 11/2015 |
| JP | 2016-078010 A | | 5/2016 |
| JP | 2016-112511 A | | 6/2016 |
| JP | 2016-155081 A | | 9/2016 |
| JP | 6139761 B1 | | 5/2017 |
| KR | 10-1370229 B1 | | 3/2014 |

OTHER PUBLICATIONS

"Electrolytic cell" Wikipedia published Apr. 24, 2013 accessed at <https://en.wikipedia.org/w/index.php?title=Electrolytic_cell&oldid=551966848> (Year: 2013).*
Machine translation of JPS5639121 (Year: 1981).*
International Search Report issued in application No. PCT/JP2017/026633 dated Oct. 24, 2017.
Office Action dated Feb. 1, 2018 in Japanese Application No. 2017-116388.
Office Action dated Oct. 27, 2017 in Japanese Application No. 2017-161597.
Office Action dated Dec. 31, 2020 in Chinese Application No. 201780044066.2.
Office Action dated Aug. 13, 2021 in Chinese Application No. 201780044066.2.
Office Action dated Jun. 18, 2020 in Australian Application No. 2017301292.
Office Action dated Jan. 15, 2020 in Australian Application No. 2017301292.
Office Action dated Jun. 28, 2019 in Australian Application No. 2017301292.

* cited by examiner

FINE BUBBLE GENERATING APPARATUS, FINE BUBBLE GENERATION METHOD, SUCTION DEVICE, AND SUCTION SYSTEM

TECHNICAL FIELD

The present invention is suitably applicable, for example, to a fine bubble generating apparatus for producing fine bubble water containing fine bubbles, a fine bubble generating apparatus for producing bubble electrolyzed water that is electrolyzed water containing fine bubbles, and a suction device and suction system for use in a fine bubble generating apparatus.

BACKGROUND ART

For fine bubble generating apparatuses, there has been widely known a technique for swirling gas-mixed liquid at high speed to produce bubble-containing liquid (for example, see PTL1).

CITATION LIST

Patent Literature

PTL1: Japanese Patent No. 4563496

SUMMARY OF INVENTION

Technical Problem

With respect to the above fine bubble generating apparatuses, there has been a demand for increasing the amount of fine bubbles.

The present invention has been made in view of the foregoing problem and intends to provide a fine bubble generating apparatus and fine bubble generation method that are able to increase the amount of fine bubbles to be contained in medium liquid, and a suction device and suction system for use in the fine bubble generating apparatus.

Solution to Problem

To solve the above problem, a fine bubble generating apparatus of the present invention includes:
a gas-liquid delivery unit that delivers mixed gas and medium liquid;
a first pipe that discharges the delivered mixed liquid;
a pump that discharges the mixed liquid under pressure;
a second pipe that discharges the mixed liquid from the pump; and
a fine bubble generating unit that generates fine bubbles in the mixed liquid supplied from the second pipe, by physical collisions under pressure.

Further, a fine bubble generation method of the present invention includes:
a gas-liquid delivery step of delivering mixed gas and medium liquid;
a supply step of supplying the delivered mixed liquid to a pump;
a fine bubble generation step of generating fine bubbles in the mixed liquid discharged by the pump, by physical collisions; and
a pressure releasing step of releasing pressure applied to the mixed liquid.

Still further, a suction device of the present invention includes:
a cylindrical portion that has a cylinder with two base surfaces, a first surface and a second surface, and that causes medium liquid supplied from a plurality of paths to flow from the first surface toward the second surface;
a plurality of introducing portions that introduce the medium liquid from the first surface or from the vicinity of the first surface into the cylindrical portion such that the medium liquid swirls inside the cylindrical portion; and
an outlet port provided at or in the vicinity of the center of the second surface.

Still further, a suction system of the present invention includes:
a plurality of first processing devices that process medium liquid;
a second processing device that processes medium liquid; and
a suction device that is provided between the first processing devices and the second processing device and that includes
a cylindrical portion that has a cylinder with two base surfaces, a first surface and a second surface, and that causes medium liquid supplied from a plurality of paths to flow from the first surface toward the second surface,
a plurality of introducing portions that introduce the medium liquid from the first surface or from the vicinity of the first surface into the cylindrical portion such that the medium liquid swirls inside the cylindrical portion, and
an outlet port provided at or in the vicinity of the center of the second surface.

Still further, a fine bubble generating apparatus of the present invention includes:
an electrolysis unit that electrolyzes raw water to produce electrolyzed water and cracked gas;
a gas-liquid delivery unit that mixes the electrolyzed water and the cracked gas and delivers the mixed liquid;
a first pipe that supplies the mixed liquid from the electrolysis unit to the gas-liquid delivery unit in a hermetically sealed state;
a fine bubble generating unit that generates fine bubbles in the mixed liquid supplied from the gas-liquid delivery unit, by physical collisions;
a second pipe that supplies the mixed liquid from the gas-liquid delivery unit to the fine bubble generating unit in the hermetically sealed state; and
a pump that is provided in the second pipe and that pumps the mixed liquid to the fine bubble generating apparatus under pressure.

Advantageous Effects of Invention

The present invention makes it possible to achieve a fine bubble generating apparatus, fine bubble augmentation apparatus, and fine bubble augmentation method that are able to increase the amount of fine bubbles to be contained in medium liquid.

In addition, this invention makes it possible to achieve a suction device and suction system that are able to homogenize medium liquid supplied from a plurality of paths.

DESCRIPTION OF EMBODIMENTS

Hereinafter, preferred embodiments of the present invention will be described with reference to the accompanying drawings.

Summary

Figure 1:
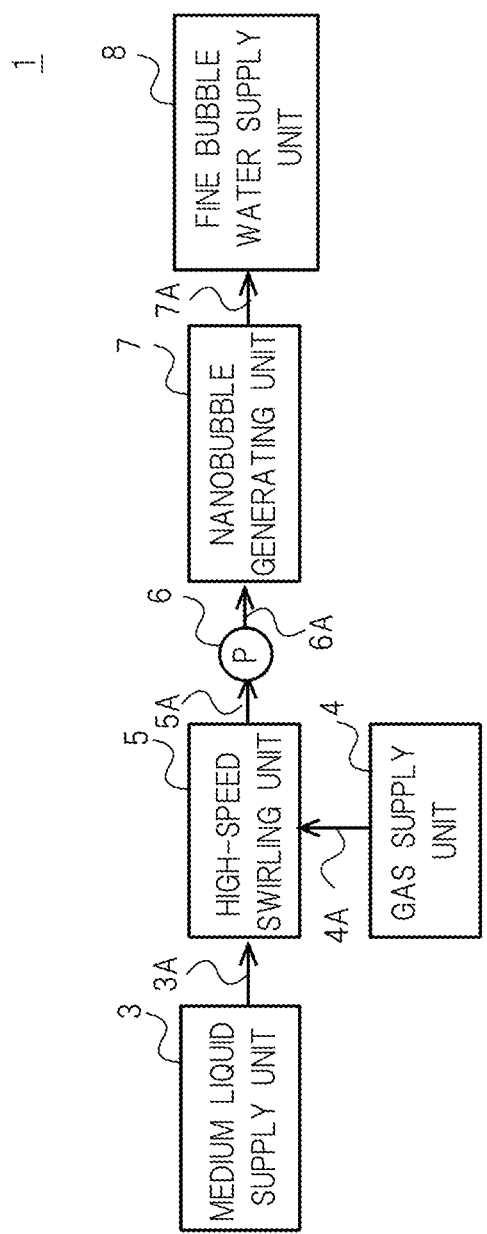
FIG. 1 is a schematic diagram illustrating a configuration of a fine bubble generating apparatus.

In FIG. 1, reference numeral 1 denotes a fine bubble generating apparatus of the present invention as a whole. In the fine bubble generating apparatus, a gas-liquid delivery unit 5 stirs medium liquid and supplied gas respectively supplied from a medium liquid supply unit 3 and a gas supply unit 4 through pipes 3A and 4A, at high speed under a prescribed pressure to produce mixed liquid, and then supplies the mixed liquid to a pump 6 through a pipe 5A. The pump 6 supplies the mixed liquid to a nanobubble generating unit 7 through a pipe 6A. The nanobubble generating unit 7 produces fine bubble water containing nanobubbles and supplies it to a fine bubble water supply unit 8 through a pipe 7A. The fine bubble water supply unit 8 releases the pressure of the fine bubble water and supplies the fine bubble water to users via a supply pipe, device, water storage tank, or another connected thereto.

In this connection, this description uses the term, nanobubbles, to refer to bubbles in nano-order size (about 10 nm to 900 nm). In this connection, with decreasing bubble diameter, their surface area increases and dissolved gas content also increases.

The medium liquid is not particularly limited and may be appropriately selected according to the intended use. For example, water, an aqueous solution, organic solvent, or another type of liquid may be used. However, water or an aqueous solution is preferably used. As water, tap water, electrolyzed water, pure water, purified water, or another type of water may be used. In addition, a filter of appropriate type may be installed in the previous stage to use water from which unnecessary substances such as impurities have been removed.

Gas (mixed gas) that will form nanobubbles is not particularly limited and may be appropriately selected according to the intended use. For example, air, hydrogen, oxygen, carbon dioxide, or another is preferably used.

In the fine bubble generating apparatus 1 of the present invention, a part from the gas-liquid delivery unit 5 to the fine bubble water supply unit 8 where pressure is released forms a hermetically sealed system and is thus under a prescribed pressure. That is, in this invention, mixed gas and medium liquid are not simply supplied to the nanobubble generating unit 7. Rather, the following preprocessing is performed on the mixed gas and medium liquid before these are supplied to the nanobubble generating unit 7: the mixed gas and medium liquid are stirred at high speed under pressure by the gas-liquid delivery unit 5 to prepare mixed liquid. The mixed liquid is then caused to pass through the pipe 5A, pump 6, and pipe 6A in this order so that the mixed gas and medium liquid blend over time, and then the mixed liquid is supplied to the nanobubble generating unit 7.

Here, the flow path to the pump 6 creates a long contact time between the mixed gas and the medium liquid, which enables the nanobubble generating unit 7 to increase the amount of nanobubbles and also leads to dissolving more mixed liquid into the medium liquid. As a result, when pressure is released by the fine bubble water supply unit 8, it is possible to generate more nanobubbles by the pressure release.

In other words, the fine bubble generating apparatus 1 is provided with the gas-liquid delivery unit 5 in the previous stage of the pump 6. Thereby, mixed gas and medium liquid blend while passing through the pipes 5A and 6A placed before and after the pump 6, and after that the generated mixed liquid flows to the nanobubble generating unit 7 where nanobubbles are generated. Then, pressure is released by the fine bubble water supply unit 8.

Note that a part from the gas-liquid delivery unit 5 to the fine bubble water supply unit 8 forms a hermetically sealed system. Therefore, a part from where the mixed gas and medium liquid are supplied to where pressure is released is under a prescribed pressure, which promotes dissolution of the mixed gas in the mixed liquid over time. As a result, it is possible to generate more nanobubbles in fine bubble water at the time of the pressure release.

As described above, the fine bubble generating apparatus 1 employs a novel fine bubble generation method using both a so-called high-speed swirling approach and pressure releasing approach, in which nanobubbles are generated with high-speed swirling after mixed gas is dissolved under a prescribed pressure, and then more nanobubbles are generated by releasing the pressure.

First Embodiment

Figure 2:
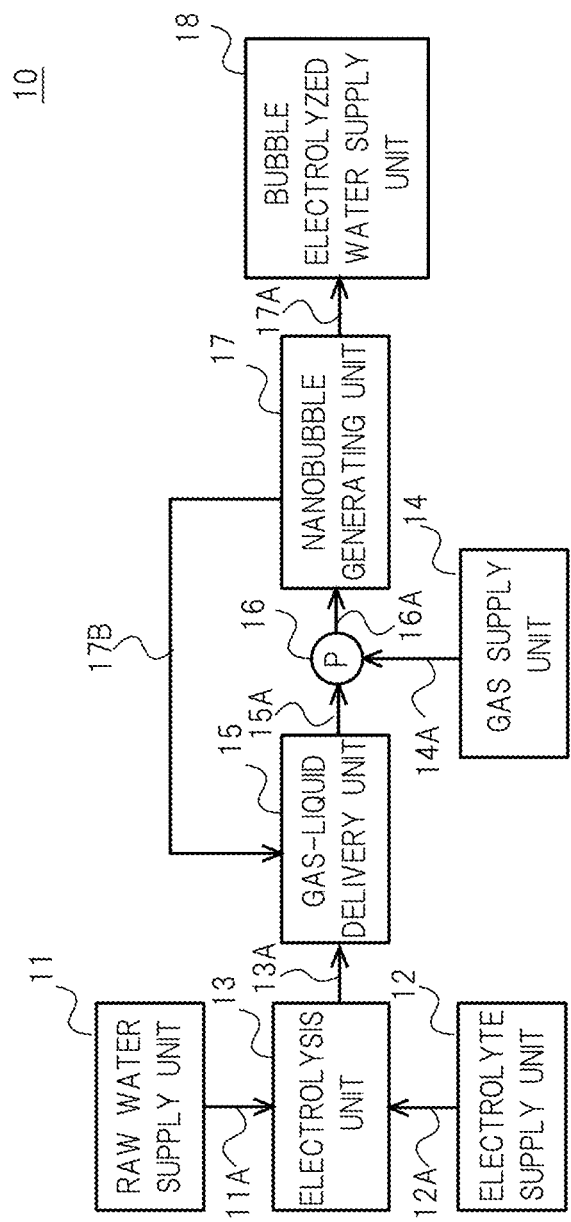
FIG. 2 is a schematic diagram illustrating a configuration of a bubble electrolyzed water generating apparatus.
Figure 3:
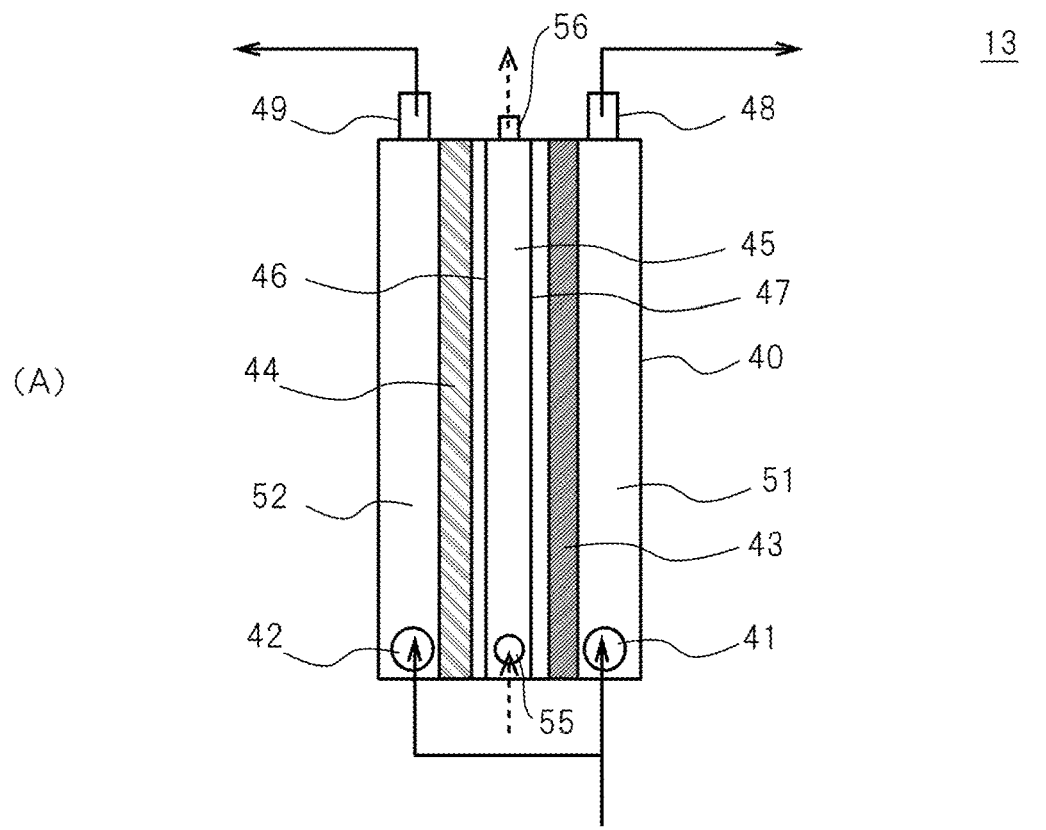
FIG. 3 is a schematic diagram illustrating a configuration (1) of an electrolysis unit.
Figure 3:
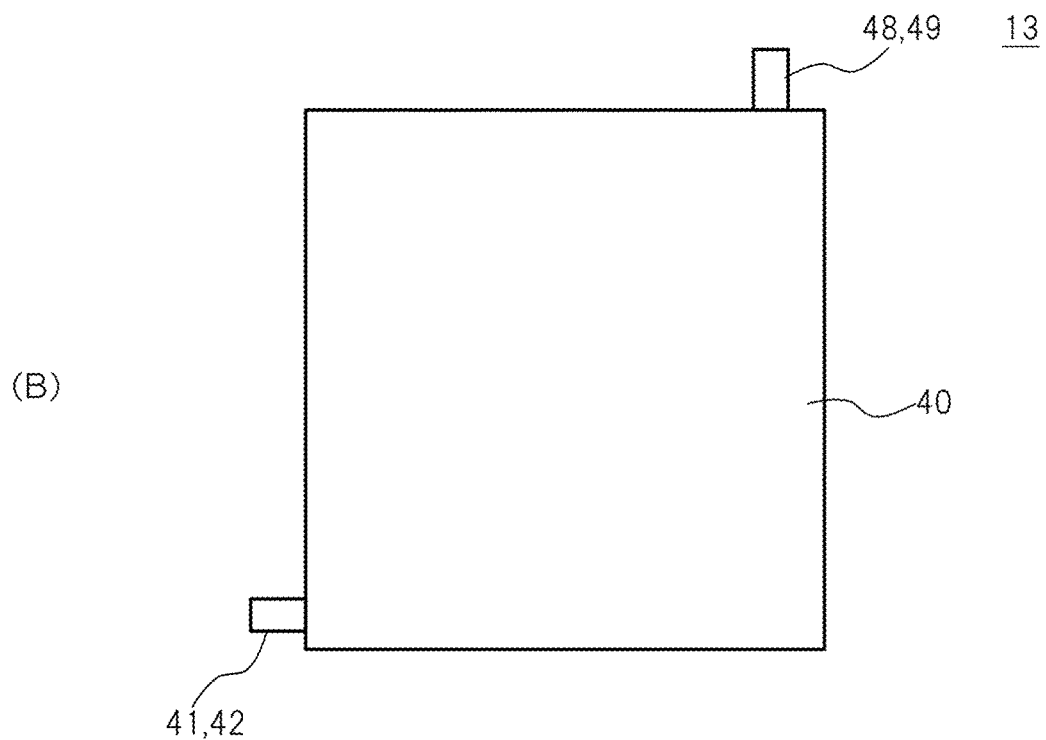

The following describes one embodiment with reference to FIGS. 2 to 6. In FIG. 2, reference numeral denotes a bubble electrolyzed water generating apparatus as a whole. The bubble electrolyzed water generating apparatus 10 uses electrolytically-generated electrolyzed water as medium liquid and produces bubble electrolyzed water that is electrolyzed water containing nanobubbles.

Although not illustrated, the bubble electrolyzed water generating apparatus 10 is entirely controlled by a control unit 20 (not illustrated) configured with an MPU (Micro Processing Unit), a ROM (Read Only Memory), and a RAM (Random Access Memory), not illustrated.

The bubble electrolyzed water generating apparatus 10 causes generated gas and electrolyzed water generated by an electrolysis unit 13 to pass through a gas-liquid delivery unit 15, pump 16, and nanobubble generating unit 17, to thereby produce bubble electrolyzed water containing the generated gas in the form of nanobubbles. In this connection, the entire system (from the electrolysis unit 13 to the nanobubble generating unit 17) is a hermetically sealed system, so that the generated gas and the electrolyzed water are mixed under a prescribed pressure, without being separated from each other. As a result, the components of the generated gas efficiently dissolve and then form into nanobubbles.

The control unit 20 controls an open-close mechanism of a raw water supply unit 11 such that the raw water supply unit 11 supplies raw water to the electrolysis unit 13 only when bubble electrolyzed water is produced. The raw water supply unit 11 supplies the raw water to the electrolysis unit 13 under pressure. In this connection, a pressure reducing mechanism, such as a pressure reducing valve, may be provided if the water pressure of tap water or the like connected is too high.

As the raw water, tap water, electrolyzed water, pure water, purified water, or another kind of water may be used. In addition, a filter of appropriate type may be installed in the previous stage to use water from which unnecessary substances such as impurities have been removed.

An electrolyte supply unit 12 supplies an electrolyte aqueous solution to the electrolysis unit 13 under the control of the control unit 20. The electrolyte is not particularly limited, and known compounds that dissolve into water and have electrolytic characteristics are appropriately used. The following description uses sodium chloride as the electrolyte for convenience, but the electrolyte is not limited thereto.

Any device that is able to produce electrolyzed water from raw water through electrolysis may be used as the electrolysis unit 13. One of a single-compartment electrolysis cell, a two-compartment electrolysis cell, and a three-compartment electrolysis cell may selectively be used according to the type of electrolyte.

For example, in the case where the electrolysis unit 13 is a three compartment electrolysis cell, a middle compartment 45 between a liquid-permeable anode compartment 43 and cathode compartment 44 is filled with brine, and diaphragms 46 and 47 are provided between these compartments, as illustrated in the cross-sectional diagram of FIG. 3(A). In this connection, the following circulation system (not illustrated) is employed for the brine: brine is supplied from an electrolyte supply port 55 and is discharged from an electrolyte outlet port 56.

As illustrated in FIG. 3(B), in the three-compartment electrolysis cell, a second raw water supply port 42 for supplying raw water to a cathode compartment is provided in the vicinity of the bottom of the electrolysis cell, and a first raw water supply port 41 for supplying raw water to an anode compartment 51 is also provided in the vicinity of the bottom of the electrolysis cell. In addition, an alkaline electrolyzed water outlet port 49 for discharging alkaline electrolyzed water is provided at the top of the electrolysis cell, and an acidic electrolyzed water outlet port 48 for discharging acidic electrolyzed water is also provided at the top of the electrolysis cell.

Therefore, raw water flows from the bottom upward, and is discharged as alkaline electrolyzed water and acidic electrolyzed water from the upper outlet ports 48 and 49 (alkaline electrolyzed water outlet port 49 and acidic electrolyzed water outlet port 48). Generated gas generated by the electrolysis moves upward by buoyancy and then is discharged from the outlet ports 48 and 49 efficiently.

Therefore, the electrolyzed water (alkaline electrolyzed water and acidic electrolyzed water) discharged from the electrolysis unit 13 contains the generated gas. The electrolysis unit 13 supplies the generated gas and electrolyzed water to the gas-liquid delivery unit 15 through a pipe 13A.

In this connection, one or both of these kinds of generated electrolyzed water are subjected to the following processing according to necessity. In the case where one of the kinds of electrolyzed water is used, processing units of one system are used for the processing. In the case where both of the kinds of electrolyzed water are used, processing units of two systems are used for the processing. For convenience, the following describes the case of processing one kind of electrolyzed water, without specifying which one, with the processing units of one system.

The gas-liquid delivery unit 15 causes generated gas and electrolyzed water to be in contact with each other over a prescribed period of time by mixing them with high-speed stirring and by swirling them at high speed, and while doing it, delivers the generated gas and electrolyzed water to the pump 16 with an approximately constant ratio between them such as to cause no bias toward either one. This mixing by the gas-liquid delivery unit 15 generates little or a very little nanobubbles (10% or less of the number of bubbles generated by the nanobubble generating unit 17).

Figure 4:
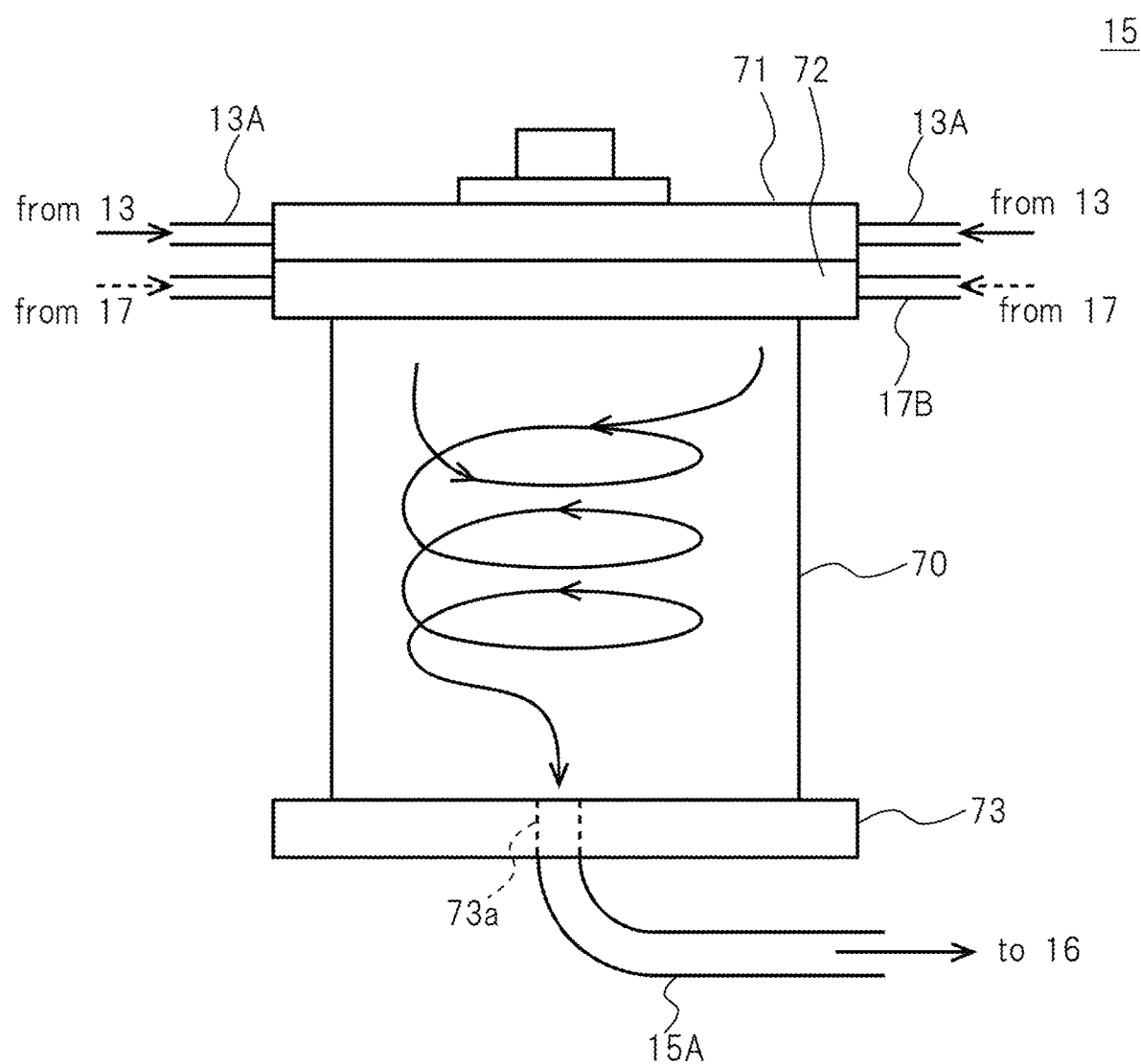
FIG. 4 is a schematic diagram illustrating a configuration of a gas-liquid delivery unit.
Figure 5:
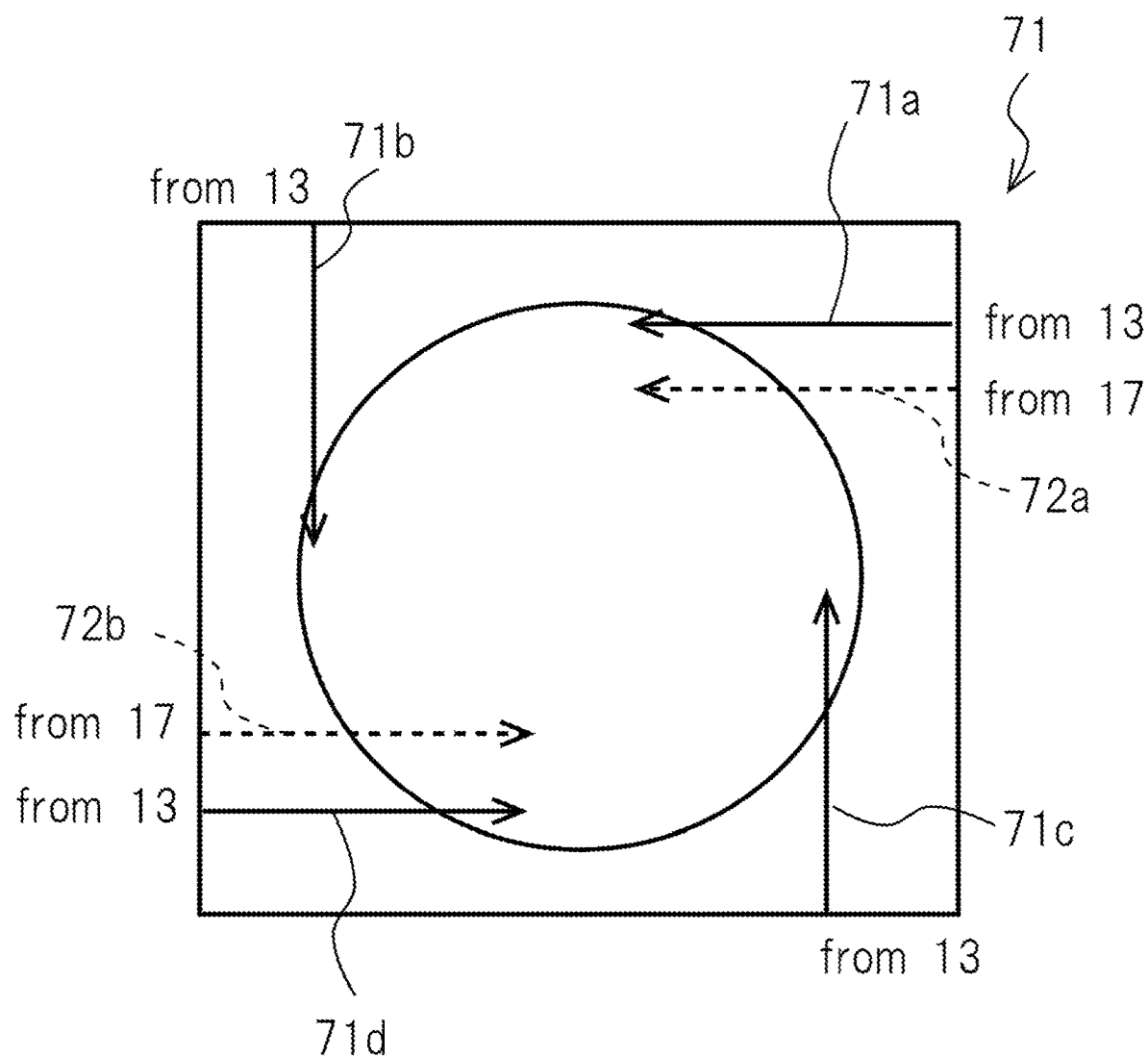
FIG. 5 is a schematic diagram for explaining supply paths.

FIGS. 4 and 5 illustrate an example of a configuration of the gas-liquid delivery unit 15. As illustrated in FIG. 4, the gas-liquid delivery unit 15 has a cylindrical member 70 sandwiched by upper rectangular plate members 71 and 72 and a lower rectangular plate member 73.

The plate members 71 to 73 serve as the base surfaces of the cylindrical member 70 and have supply paths for supplying electrolyzed water and mixed gas to the cylindrical member 70. As illustrated in FIG. 5, the electrolyzed water (including generated gas) is supplied to the cylindrical member 70 through supply paths 71a to 71d formed in the plate member 71. In addition, supply paths 72a and 72b are formed in the plate member 72 so that, when part of bubble electrolyzed water produced by the nanobubble generating unit 17 overflows, the overflow is supplied to the cylindrical member 70 through a pipe 17B.

The supply paths 71a to 71d and 72 to 72b are formed almost in parallel to the tangential direction (±30°) with respect to the cylindrical member 70, such that influent electrolyzed water (electrolyzed water and bubble electrolyzed water) circles along the inner surface of the cylindrical member 70.

In addition, an outlet port 73a that is a hole for discharging mixed water that is a mixture of electrolyzed water and mixed gas (generated gas) is provided at the center of the plate member 73, so that the mixed water is discharged through a pipe 15A. It is considered that a low-speed swirling flow occurs inside the pipe 15A and therefore the electrolyzed water and mixed gas are stirred in the pipe 15A until they reach the pump 16, which prevents large gas accumulation.

As a result, due to a downward force caused by the flow-in from the top and the discharge from the bottom, the electrolyzed water supplied along the cylindrical member 70, and the location of the outlet port 73a, the electrolyzed water and mixed gas swirl inside the cylindrical member 70 while being stirred at high speed, and then are supplied through the pipe 15A to the pump 16 in a state where they are mixed well with the mixed gas in the form of small bubbles.

For example, this gas-liquid delivery unit 15 not only generates high pressure with centrifugation caused by the high-speed swirling and causes the generated gas and electrolyzed water to be in contact with each other at an interface between the gas phase and the liquid phase under the high pressure to promote dissolution of gas with high resolvability into water, such as chlorine gas, but also takes a role of preventing pressure generated by the pump 16 from influencing the electrolysis unit 13. In other words, the gas-liquid delivery unit 15 is able to block transmission of the pressure between the electrolysis unit 13 and the pump 16 via the gas-liquid delivery unit 15 by the high-speed swirling.

In this connection, the pressure at the previous stage (pipes 14A and 15A) of the gas-liquid delivery unit 15 is controlled to range from −15 kpa to +15 kpa, more preferably from −10 kpa to +10 kpa, for example. This makes it possible to prevent the pressure from being applied to the electrolysis unit 13 in the previous stage and thus to prevent damage of the diaphragms 46 and 47. This control is achieved by adjusting a solenoid valve provided in the pipe 17B. If the pressure does not fall into the above range through the adjustment, the apparatus is stopped urgently for protection of the apparatus.

In the case of using air as gas, an air pump as a gas supply unit 14, compressed air, and others may be used. This gas supply unit 14 is used to increase the amount of gas because only the amount of generated gas may be insufficient, but is not always necessary. It is possible to use only generated gas as the mixed gas. In this embodiment, mixed gas is supplied to the pump 16, not to the gas-liquid delivery unit 15, in order that chlorine gas included in the generated gas is dissolved into the electrolyzed water at a high concentration, without being rarefied. Alternatively, the mixed gas may be supplied to the gas-liquid delivery unit 15. In this case, the mixed gas is preferably mixed at the center of the vortex by supplying the mixed gas from about the center at the top of the plate members 71 and 72.

The pump 16 (FIG. 2) is not particularly limited, and one of publicly known pumps may be used. For example, a bubbling pump (for example, SUS-type general-purpose vortex turbine pump 20NPD07Z (Nikuni Inc.)) that rotates with wings is preferably used because this pump promotes mixing between gas and liquid in the previous stage of the nanobubble generating unit 17. The pump 16 applies pressure to mixed water coming through the pipe 15A, and for example, supplies the mixed water at a constant rate of 20 L/min to the nanobubble generating unit 17 through a pipe 16A. At this time, little gas accumulation occurs in the mixed water because of the effect of the gas-liquid delivery unit 15, and a problem due to gas entrainment or the like is unlikely to occur in the pump 16. As a result, it is possible to supply the mixed water at a stable flow rate to the nanobubble generating unit 17.

The nanobubble generating unit 17 is of a high-speed swirling type that allows medium liquid (mixed water) to contain nanobubbles (fine bubbles) formed of gas through high-speed swirling, and the configuration of the nanobubble generating unit 17 is not particularly limited. For example, although not illustrated, the nanobubble generating unit 17 is designed to change angles due to collisions while swirling the inside of a plurality of cylindrical members.

The nanobubble generating unit 17 creates a gas-liquid interface based on a specific gravity difference under a state where the speed of the gas and medium liquid is accelerated by swirling them, and generates nanobubbles by friction between the gas and the liquid at the interface. In addition, the nanobubble generating unit 17 causes the medium liquid to bump into the wall surface to change its moving direction and disturb the flow of the medium liquid, and stirs the gas and medium liquid vigorously to mix them. The physical collisions between the gas and the medium liquid make bubbles smaller, thereby generating much more nanobubbles.

The nanobubble generating unit 17 suddenly changes the moving direction of the medium liquid while swirling the medium liquid at high speed. By doing so, the nanobubble generating unit 17 allows the medium liquid to have higher acceleration, so that the physical collisions between the gas and the medium liquid disperse bubbles into smaller bubbles. The nanobubble generating unit 17 is preferably designed to change the moving direction of the medium liquid at a steep angle of 80° or more by causing the medium liquid swirling at high speed to bump into the wall surface.

The nanobubble generating unit 17 supplies bubble electrolyzed water containing nanobubbles generated with the high-speed swirling under a prescribed pressure, to a bubble electrolyzed water supply unit 18. The bubble electrolyzed water supply unit 18 has an open-close mechanism and is opened and closed under the control of the controller 20.

According to the Henry's law, the solubility of gas in liquid increases as the pressure on the liquid increases. Therefore, it is known that, by pressurizing the liquid under the presence of gas and then drastically reducing the pressure, dissolved gas turns into fine bubbles in the liquid.

When the bubble electrolyzed water supply unit 18 supplies bubble electrolyzed water using a tap to the user, the pressure is released at the moment the bubble electrolyzed water is discharged from the tap. In addition, in the case where a cleaning apparatus is installed in the latter stage, a pipe (not illustrated) for it is connected to the bubble electrolyzed water supply unit 18. In this case, a pressure releasing unit (not illustrated) is provided external to the bubble electrolyzed water generating apparatus 10 so that the pressure is released down to air pressure at once inside the cleaning apparatus or a storage tank provided in the latter stage. Due to the drastic drop in the pressure, part of gas dissolved in the bubble electrolyzed water turns into nanobubbles, thereby increasing nanobubbles in the bubble electrolyzed water.

As described above, in the bubble electrolyzed water generating apparatus 10, the gas-liquid delivery unit 15 is provided in the previous stage of the nanobubble generating unit 17, so that the flow path to the pump 6 creates a long contact time between mixed gas and electrolyzed water. Thereby, the mixed gas is blended in the electrolyzed water so that small bubbles are likely to be generated, which contributes to generating more bubbles in the nanobubble generating unit 17. In addition, the solubility of mixed gas in the electrolyzed water is increased, which contributes to increasing the amount of nanobubbles to be generated at the time of pressure release.

In addition, in the case where chlorine gas is generated as part of generated gas (that is, in the case where electrolyte contains chlorine), chlorine with higher solubility to water than gas is preferentially dissolved in the electrolyzed water. This phenomenon more remarkably appears as the contact time between gas and liquid becomes longer. Therefore, mixed gas and oxygen gas (including ozone gas) remain in the gaseous state in the mixed water supplied to the nanobubble generating unit 17, but most of the chlorine gas is in a state of being dissolved in the mixed water.

When the mixed water in this state is supplied to the nanobubble generating unit 17, little chlorine gas is contained in nanobubbles generated through high-speed swirling. Although it is considered that part of chlorine turns into nanobubbles at the time of pressure release, other gas preferentially turns into nanobubbles because the chlorine has high solubility, so that most of chlorine is in a state of being dissolved in the bubble electrolyzed water.

In the case where the bubble electrolyzed water is used as sterilization or disinfectant agent, the concentration of dissolved chlorine is very important. In the case where chlorine gas is generated as part of generated gas, the bubble electrolyzed water generating apparatus 10 enables most of electrolytically-generated chlorine components to be dissolved in the bubble electrolyzed water, which increases the effective concentration of chlorine and improves the effects of sterilization and disinfectant.

Figure 6:
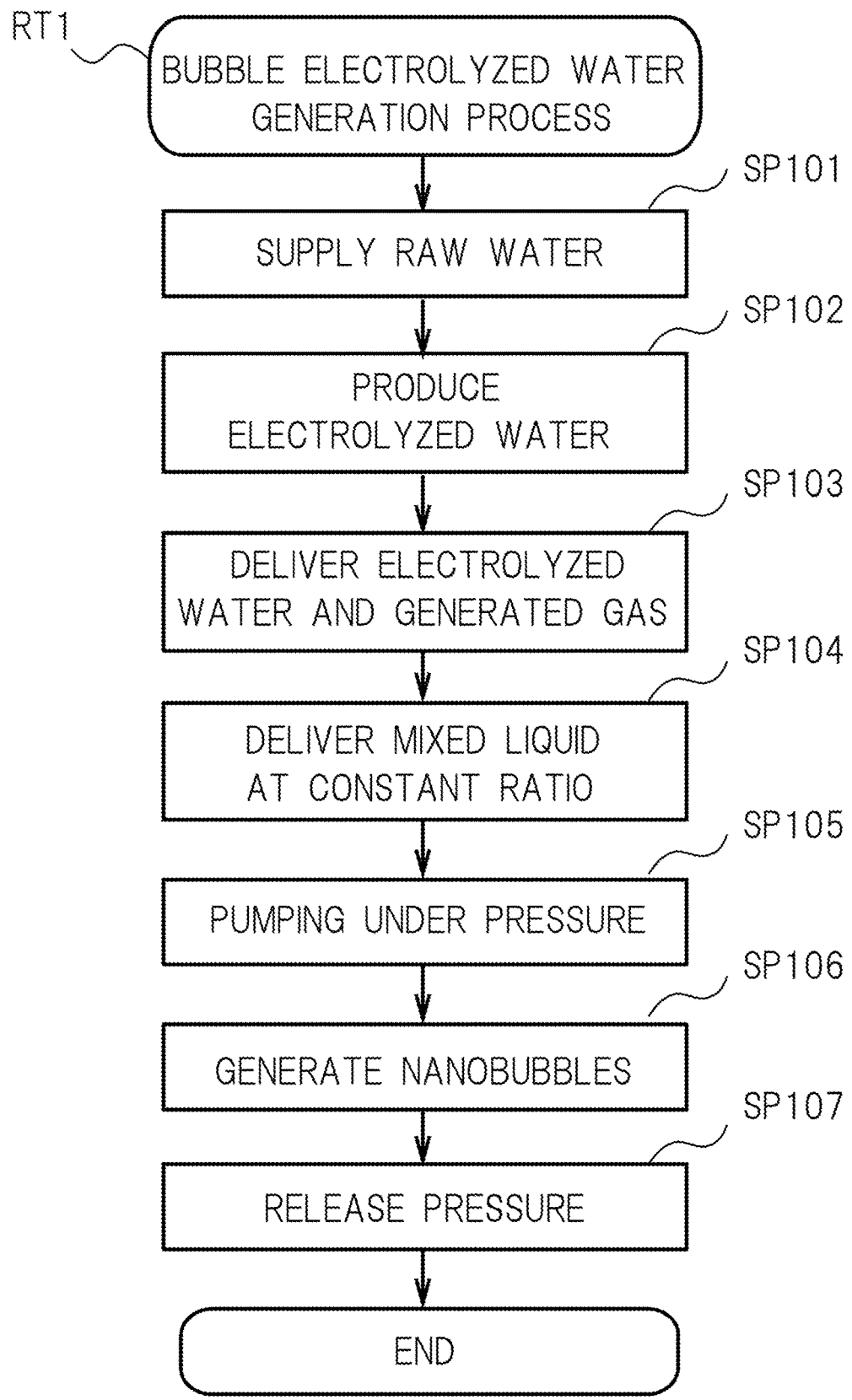
FIG. 6 is a flowchart for explaining a bubble electrolyzed water generation process.

That is, as illustrated in FIG. 6, in the bubble electrolyzed water generation process RT1 of this invention, raw water is supplied under pressure at step SP101, and then the raw water is electrolyzed to produce electrolyzed water at step SP102.

The electrolyzed water and generated gas are delivered at step SP103, and the mixed water is sent such that the ratio of the electrolyzed water and the generated gas becomes constant at time series at step SP104. Then, the mixed water is pumped under pressure by a pump at step SP105, and nanobubbles are generated with high-speed swirling at step SP106.

Then, the pressure is released at step SP107. As a result, nanobubbles are generated by the pressure release.

As described above, using a hermetically sealed system from step SP101 to step SP106, nanobubbles are generated under pressure by the high-speed swirling approach, and then nanobubbles are generated by the pressure releasing approach. Since the time to blend the electrolyzed water and the generated gas (and mixed gas) sufficiently is secured, it is possible to generate much more nanobubbles.

Second Embodiment

A second embodiment will now be described with reference to FIGS. 7 and 8. In this connection, the same reference numerals as in the first embodiment are used to denote the same or similar elements, and detailed description thereof will be omitted.

Figure 7:
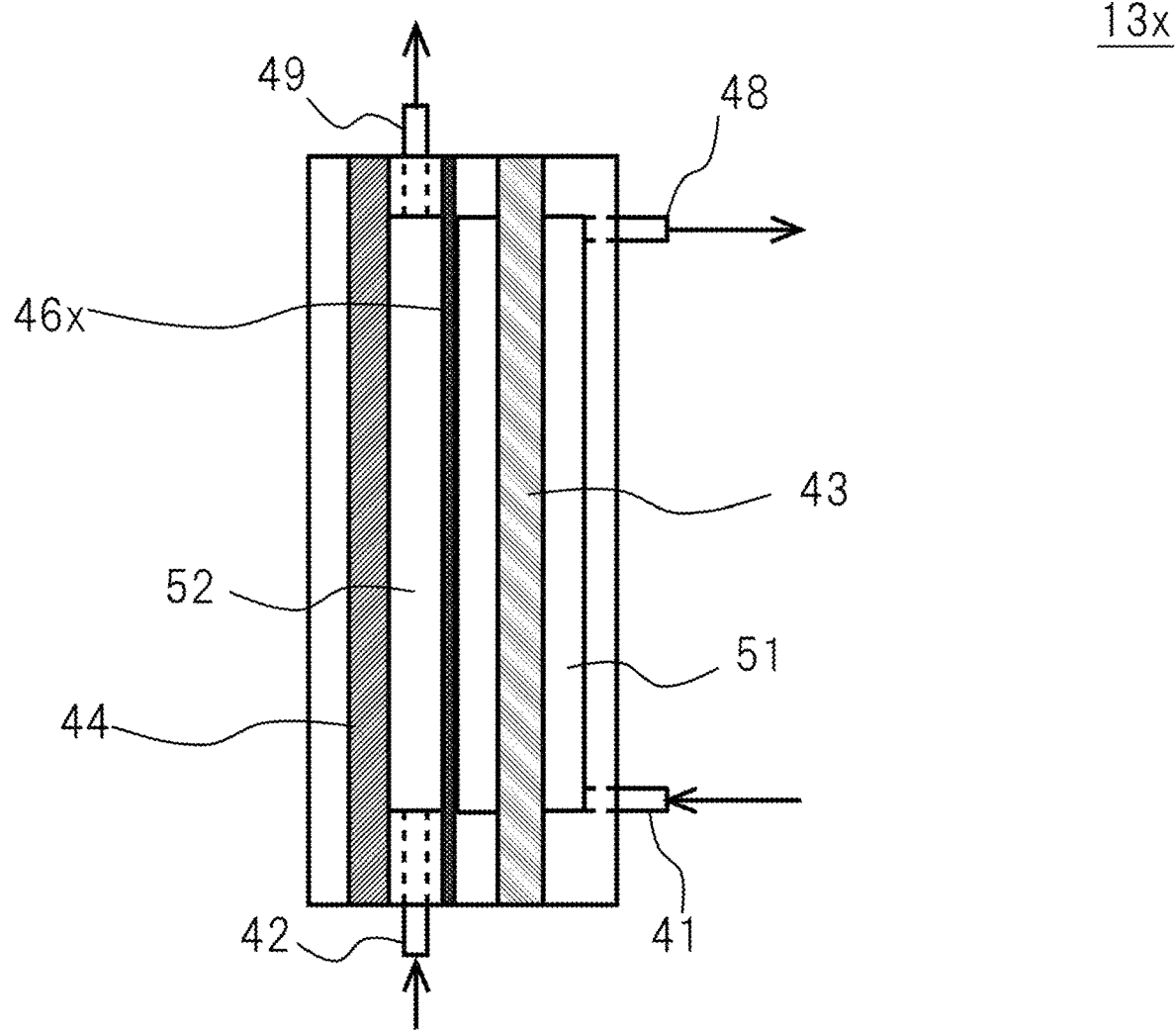
FIG. 7 is a schematic diagram illustrating a configuration (2) of an electrolysis unit.
Figure 8:
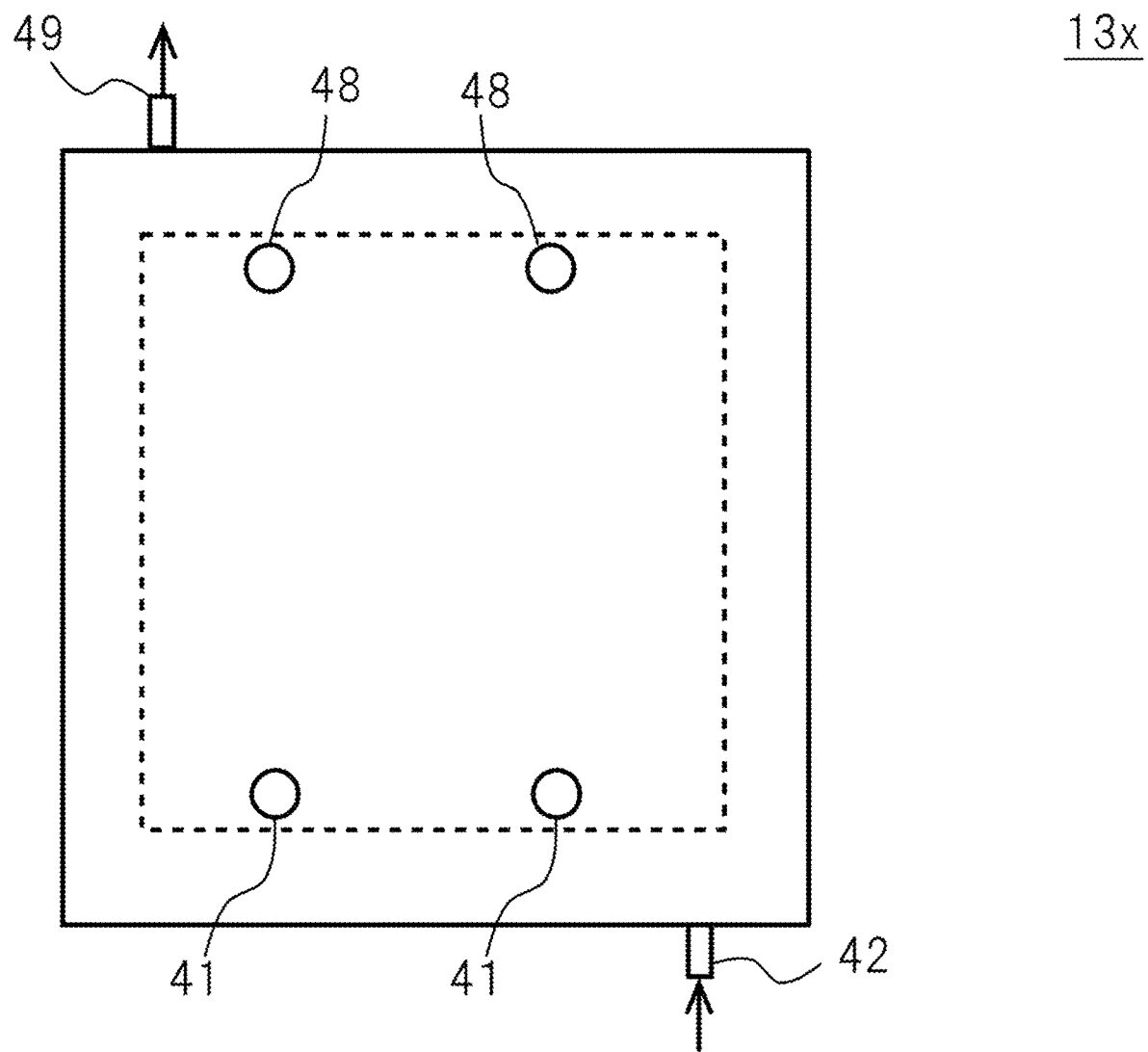
FIG. 8 is a schematic diagram illustrating the configuration (3) of the electrolysis unit.

The second embodiment will describe the case where a two-compartment electrolysis cell illustrated in FIGS. 7 and 8 is used as an electrolysis unit 13x and only acidic electrolyzed water is provided. In this connection, it is also possible to use the same configuration in order to generate only alkaline electrolyzed water.

As illustrated in FIGS. 7 and 8, this electrolysis unit 13x has two first raw water supply ports 41 for supplying raw water to an anode compartment 51 in the vicinity of the bottom of the electrolysis cell. The electrolysis unit 13x also has two acidic electrolyzed water outlet ports 48 for discharging acidic electrolyzed water at the top of the electrolysis cell. The top of the electrolysis cell refers to the top of inner surface of the anode compartment 51. This applies hereafter.

Therefore, raw water flows from the bottom upward and is discharged as acidic electrolyzed water from the upper acidic electrolyzed water outlet ports 48. At this time, generated gas generated by electrolysis moves upward by buoyancy and then is discharged from the acidic electrolyzed water outlet ports 48 efficiently.

Therefore, the acidic electrolyzed water discharged from the electrolysis unit 13x is in a state of containing the generated gas (chlorine gas and oxygen gas). The electrolysis unit 13x supplies the generated gas and electrolyzed water to the gas-liquid delivery unit 15 through a pipe 13A.

On the other hand, an electrolyte supply port 42 for supplying an electrolyte aqueous solution having electrolyte (sodium chlorine) dissolved therein, to a cathode compartment 52 is provided in the vicinity of the bottom of the electrolysis cell. In addition, an alkaline electrolyzed water outlet port 49 for discharging alkaline electrolyzed water is provided at the top of the electrolysis cell.

Therefore, the electrolyte aqueous solution flows from the bottom upward, and is discharged from the alkaline electrolyzed water outlet port 49. At this time, generated gas generated by the electrolysis moves upward by buoyancy and then is discharged from the alkaline electrolyzed water outlet port 49 efficiently.

Figure 9:
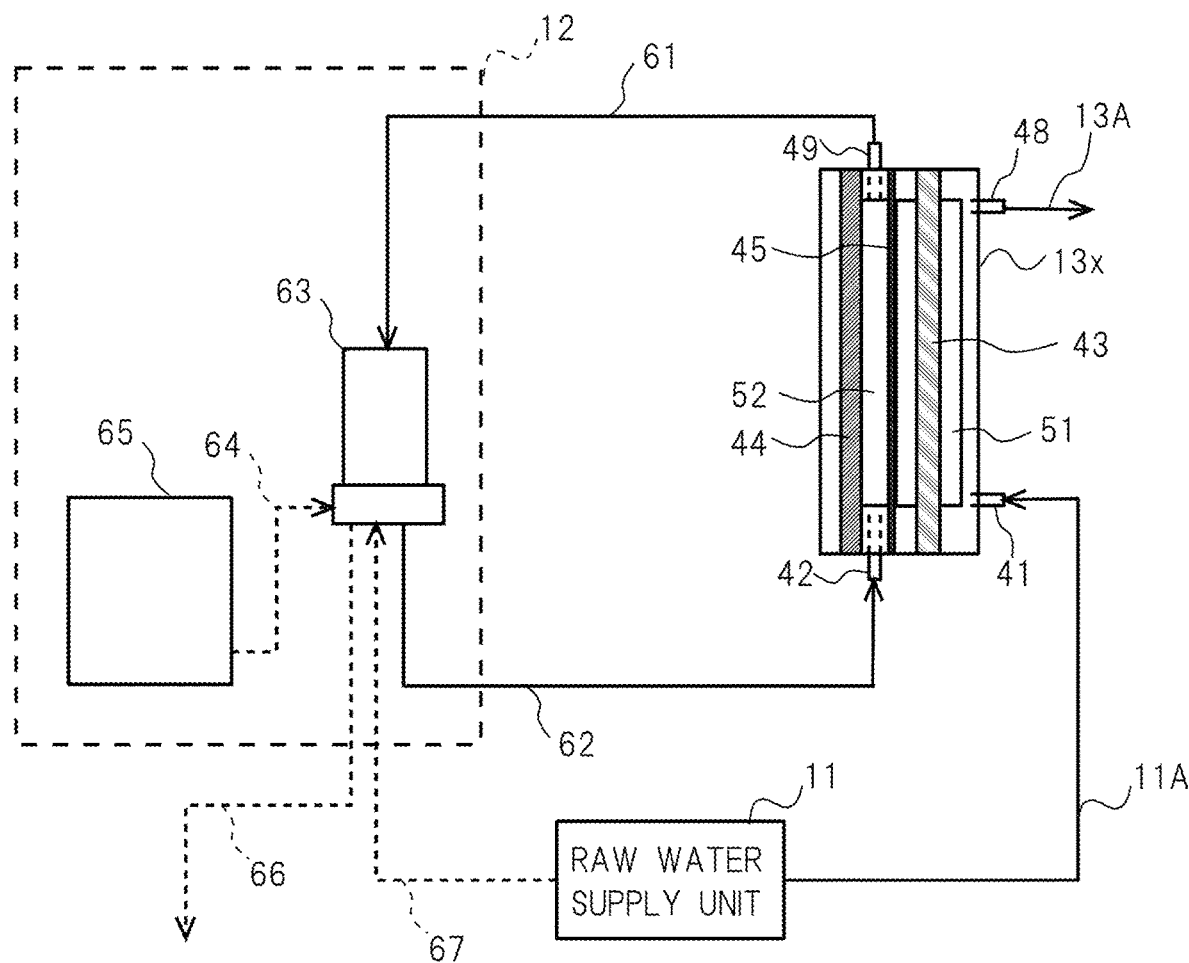
FIG. 9 is a schematic diagram for explaining a flow in an electrolyzed water generation process.
Figure 10:
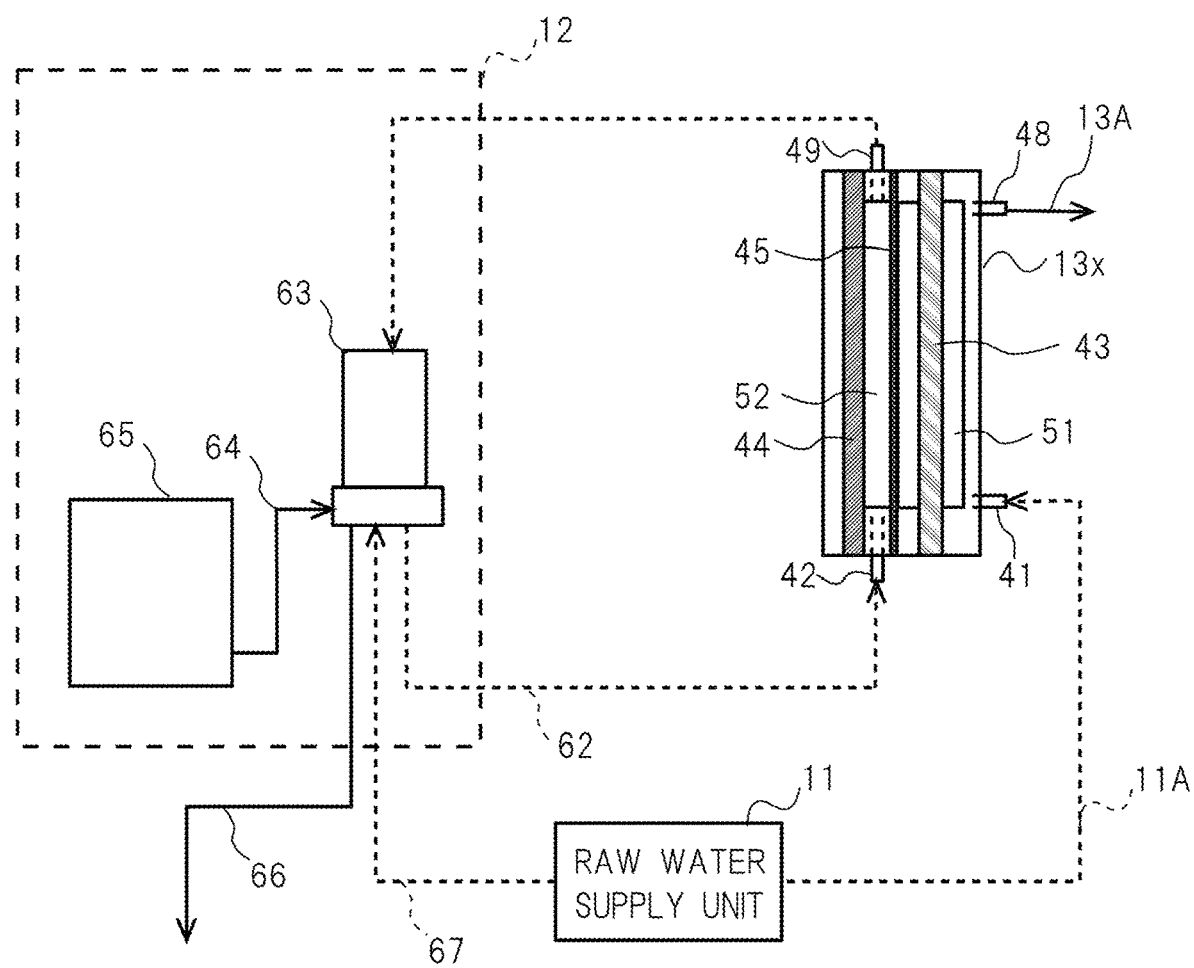
FIG. 10 is a schematic diagram for explaining a flow in a replacement process.

As illustrated in FIG. 9, a circulation tank 63 is connected to the alkaline electrolyzed water outlet port 49 and electrolyte supply port 42 with pipes 61 and 62. An electrolytic supply tank 65 and a raw water supply unit 11 are connected to the circulation tank 63 with pipes 64 and 67. In addition, the circulation tank 63 has a pipe 66 for discarding. Each of the pipes 61, 62, 64, 66, and 67 has an open-close mechanism, and is opened and closed under the control of a control unit 20.

During supply of the electrolyzed water, the control unit 20 causes the raw water supply unit 11 to supply raw water to the anode compartment 51 and also causes the circulation tank 63 to supply an electrolyte aqueous solution to the cathode compartment 52.

That is, the bubble electrolyzed water generating apparatus 10 supplies the electrolyte aqueous solution from the circulation tank 63 to the cathode compartment 52 to perform electrolysis, and returns alkaline electrolyzed water generated by the electrolysis back to the circulation tank 63 to reuse it as the electrolyte aqueous solution.

However, if the electrolyte aqueous solution is circulated for a long time, the concentration of negative ion (chlorine ion) in the circulation tank 63 decreases.

To deal with this, as illustrated in FIG. 9, the control unit 20 discards a small amount of electrolyte aqueous solution (for example, about 1/20 to 1/5 of the tank capacity) through the pipe 66 at prescribed refill intervals (for example, at intervals of 15 to 120 minutes), and refills the circulation tank 63 with the same amount of electrolyte aqueous solution.

In addition, if the electrolyte aqueous solution is circulated for a long time, the pH level of the electrolyte aqueous solution increases. To deal with this, the control unit 20 discards all electrolyte aqueous solution in the circulation tank 63 through the pipe 66 at prescribed replacement intervals (for example, at intervals of 5 to 25 hours), and fills up the circulation tank 63 with an electrolyte aqueous solution.

Figure 11:
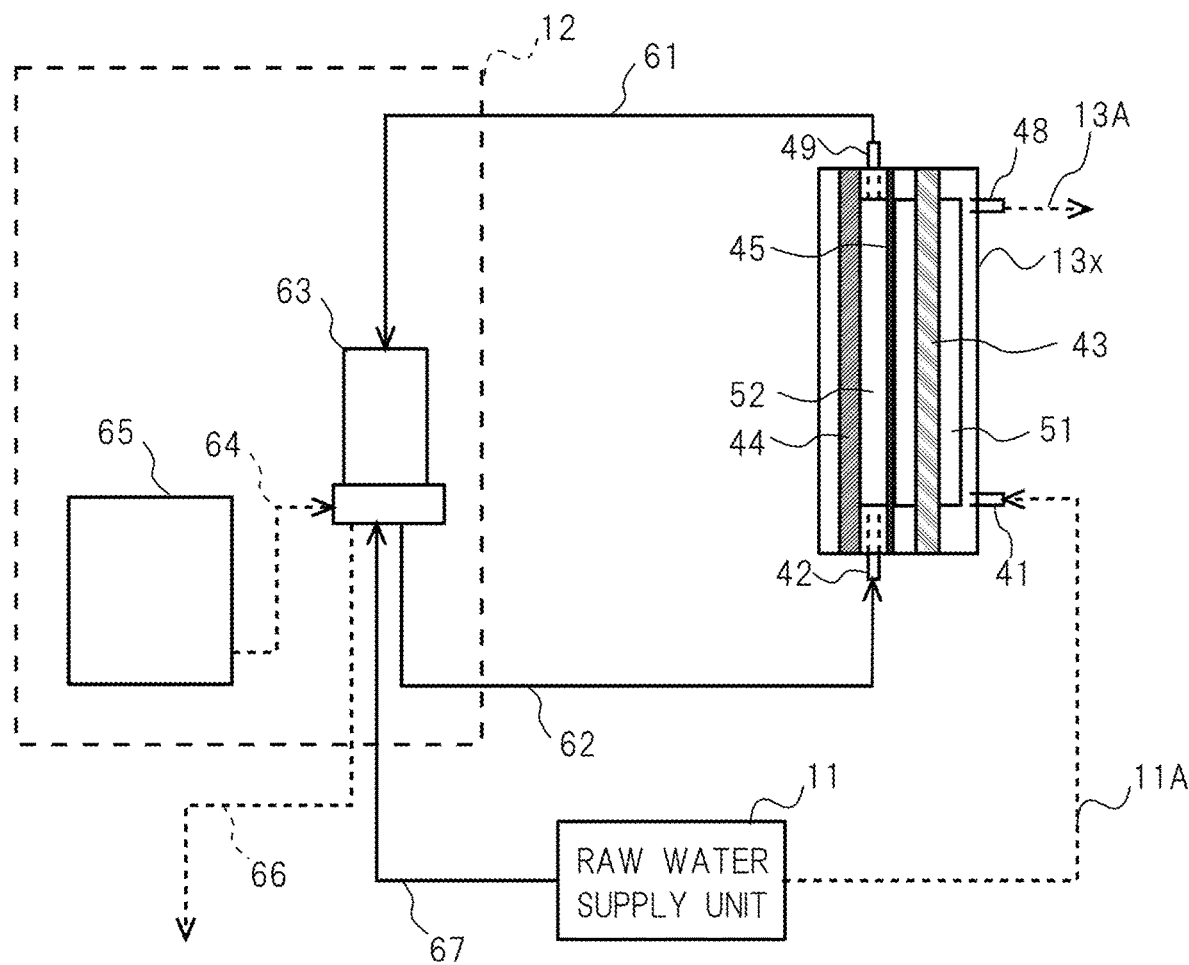
FIG. 11 is a schematic diagram for explaining a flow in a cleaning process.

Further, as illustrated in FIG. 11, the control unit 20 performs a cleaning process on the circulation tank 63 and cathode compartment 52 at prescribed cleaning times.

More specifically, the control unit 20 discards all electrolyte aqueous solution in the circulation tank 63 through the pipe 66, and then fills the circulation tank 63 with raw water from the raw water supply unit 11. Then, the control unit 20 circulates the raw water inside the circulation tank 63 and cathode compartment 52 through the pipes 62 and 61. For example, this process is performed for 10 minutes to 1 hour every cleaning. In this connection, during the cleaning, the control unit 20 continues supplying raw water while discarding part of raw water. Alternatively, a batch-type cleaning process may be performed in which a fixed amount of raw water is supplied and circulated, and then all the raw water is discarded and raw water is supplied again. Such a cleaning process may be performed once or a plurality of times.

In this connection, a neutralization device for neutralizing alkaline is preferably provided in the pipe 66. By doing so, it becomes possible to adjust the pH level of concentrated alkaline electrolyzed water to an appropriate level before discarding it.

As described above, the bubble electrolyzed water generating apparatus 10 is provided with the electrolysis unit 13*x* that is a two-compartment electrolysis cell with a diaphragm 46*x*, so that alkaline electrolyzed water generated by supplying an electrolyte aqueous solution to the cathode compartment 52 is circulated as the electrolyte aqueous solution via the circulation tank 63 and only acidic electrolyzed water is supplied as bubble electrolyzed water from the bubble electrolyzed water supply unit 18.

Further, the bubble electrolyzed water generating apparatus 10 has a discarding mechanism (pipe 66) for discarding an electrolyte aqueous solution from the circulation tank 63 and a filling mechanism (pipe 64 and electrolyte supply tank 65) in order to automatically replace the electrolyte aqueous solution. Still further, in the bubble electrolyzed water generating apparatus 10, the raw water supply unit 11 is connected to the circulation tank 63 in order that the circulation tank 63 is automatically cleaned.

With the above configuration, it is possible to reuse alkaline electrolyzed water that would have otherwise been discarded, to decrease the amount of water used, and to greatly reduce the amount of alkaline electrolyzed water to be discarded since the alkaline electrolyzed water is concentrated. In addition, the cathode compartment 52, circulation tank 63, and pipes 61 and 62 are cleaned with raw water, which is needed due to the concentration of the alkaline electrolyzed water, so as to prevent mineral components from being attached thereto.

Operations and Effects

The features of the invention derived from the above-described embodiments will now be described, using problems, effects, and others according to necessity. In the following description, corresponding units in the above embodiments are indicated in parentheses for easily understanding, but the configuration is not limited to the specific units indicated in the parentheses. In addition, the meanings of terms, examples, and others described for each feature may apply to those described for the other features.

A fine bubble generating apparatus (fine bubble generating apparatus 1 or bubble electrolyzed water generating apparatus 10) of the present invention includes:

a gas-liquid delivery unit (gas-liquid delivery unit 5, 15) for delivering mixed gas and medium liquid;

a first pipe (pipe 5A, 15A) for discharging the delivered mixed liquid;

a pump (pump 6, 16) for discharging the mixed liquid under pressure;

a second pipe (pipe 6A, 16A) for discharging the mixed liquid from the pump; and a fine bubble generating unit (nanobubble generating unit 7, 17) for generating fine bubbles in the mixed liquid coming through the second pipe, by physical collisions under pressure.

Thereby, the fine bubble generating apparatus is able to swirl the mixed gas and the medium liquid at high speed and then blend the mixed gas and the medium liquid over a long period of time using a flow path to the pump, so as to increase the solubility of the mixed gas in the medium liquid and also increase the amount of nanobubbles to be generated at the time of pressure release.

Further, the fine bubble generating unit in the fine bubble generating apparatus generates the fine bubbles in the medium liquid by high-speed swirling.

The fine bubble generating apparatus is able to mix the mixed gas and medium liquid in a short time efficiently. In addition, since the bubble size of the mixed gas is made smaller effectively, air accumulation does not occur in the flow path to the pump, and troubles due to air entrainment in the pump is prevented. In this connection, the air entrainment means that a pressure loss occurs due to air accumulation and thereby the amount of mixed water discharged by the pump or pressure is changed.

Still further, the gas-liquid delivery unit in the fine bubble generating apparatus generates a high-speed swirling flow in one direction in a cylinder.

Thereby, the fine bubble generating apparatus is able to make the bubble size of the mixed gas smaller in a short time effectively, with generating little nanobubbles.

The gas-liquid delivery unit in the fine bubble generating apparatus that has the cylinder with two base surfaces, a first surface and a second surface, flows the mixed liquid in a direction approximately perpendicular to the first surface toward the second surface while rotating the mixed liquid in the in-plane direction of the first surface, supplies the mixed liquid in the rotational direction, and supplies the mixed liquid swirling at high speed to the first pipe via a hole provided at or in the vicinity of the center of the second surface. In this connection, to supply the mixed liquid in the rotational direction means to supply the mixed liquid tangentially to the circle of the inner surface of the cylinder such that the mixed liquid swirls along the inner surface of the cylinder. It is preferable that the mixed liquid be supplied in the same rotational direction from at least two different directions in the plane direction of the first surface.

Thereby, the fine bubble generating apparatus is able to swirl the medium liquid at high speed with a simple configuration.

In the fine bubble generating apparatus, the mixed gas is supplied from the center of the first surface or from the vicinity of the center of the first surface.

Thereby, the fine bubble generating apparatus is able to mix the medium liquid and the mixed gas smoothly.

The fine bubble generating apparatus further includes:

a third pipe (pipe 13A) that is provided in the previous stage of the gas-liquid delivery unit and that supplies the medium liquid to the gas-liquid delivery unit; and an electrolysis unit (electrolysis unit 13) that is provided in the previous stage of the third pipe and that supplies a mixture of electrolyzed water and generated gas generated by electrolyzing raw water, as the medium liquid to the third pipe.

By using the electrolyzed water as the medium liquid, it becomes possible to produce bubble electrolyzed water that is electrolyzed water containing nanobubbles and to allow generated gas generated by the electrolysis to be contained in the form of nanobubbles. In this connection, the electrolysis unit is preferably a two-compartment electrolysis cell in which the cathode compartment containing a negative electrode and the anode compartment containing a positive electrode are separated by a diaphragm.

The electrolysis unit in the fine bubble generating apparatus includes:

a raw water supply port that is provided at or in the vicinity of a bottom of the electrolysis unit and that supplies raw water to the cathode compartment containing the negative electrode; and an alkaline electrolyzed water outlet port that is provided at or in the vicinity of the top of the electrolysis unit and that discharges alkaline electrolyzed water.

Thereby, the fine bubble generating apparatus is able to discharge generated gas generated in the electrolysis unit by buoyancy without omissions, and then supply it to the gas-liquid delivery unit.

The fine bubble generating apparatus includes:

a raw water supply port that is provided at or in the vicinity of the bottom and that supplies raw water to the anode compartment containing the positive electrode; and an acidic electrolyzed water outlet port that is provided at or in the vicinity of the top and that discharges acidic electrolyzed water.

Thereby, the fine bubble generating apparatus is able to discharge generated gas generated in the electrolysis unit by buoyancy without omissions and then supplies it to the gas-liquid delivery unit.

In the fine bubble generating apparatus, the electrolysis unit is supplied with an electrolyte solution containing chlorine.

The fine bubble generating apparatus enables electrolyzed water and generated gas to be in contact with each other over a long period of time during high-speed swirling and subsequent delivery to the pump, so as to thereby make most of chlorine contained in the generated gas in a dissolved state (as hypochlorous acid) and to prevent air accumulation and thereby prevent troubles with the pump due to air entrainment.

A fine bubble generation method of the present invention includes:

a delivery step of delivering mixed gas and medium liquid with a constant ratio between them through high-speed swirling or another (step SP104);

a supply step of supplying the mixed liquid to a pump (step SP105);

a fine bubble generation step of generating fine bubbles in the mixed liquid discharged by the pump, by physical collisions (step SP106); and a pressure releasing step of releasing the pressure applied to the mixed liquid (step S107).

Thereby, the fine bubble generation method is able to blend the mixed liquid swirling at high speed, over a long period of time using a flow path to the pump and then proceeds to the fine bubble generation step so as to generate more nanobubbles, and is also able to increase the solubility of mixed gas in the medium liquid so as to increase the amount of nanobubbles to be generated in the pressure releasing step.

A gas-liquid delivery device of the present invention includes a high-speed swirling unit for blocking pressure transmission between the previous stage and the latter stage with centrifugation caused by high-speed swirling.

Thereby, according to the Pascal's principle, it is possible to block transmission of pressure that is naturally transmitted between the previous stage and the latter stage connected in a hermetically sealed system.

The gas-liquid delivery device (gas-liquid delivery unit 15) includes:

a cylinder having two base surfaces, a first surface (first surface 201) and a second surface (second surface 202);

a liquid supply unit (supply paths 71*a* to 71*d*) for supplying mixed liquid that is a mixture of liquid and gas, from the first surface tangentially to the cylinder;

a cylindrical portion (cylindrical member 70) which has the cylinder and in which the mixed liquid, which is the mixture of the gas and the liquid, swirls while flowing from the first surface toward the second surface; and an outlet port (outlet port 214) that is provided at or in the vicinity of the center of the second surface and that discharges the swirling mixed liquid.

The gas-liquid delivery device supplies the gas from the vicinity of the center of the first surface. The gas-liquid delivery device is able to mix the gas by negative pressure occurring around the center due to generation of a vortex.

Further, a suction device and suction system of the present invention are suitably applicable, for example, to a fine bubble generating apparatus for producing fine bubble water containing fine bubbles and a fine bubble generating apparatus for producing bubble electrolyzed water that is electrolyzed water containing fine bubbles.

Conventionally, a suction device that has wings for stirring has widely been used to mix liquid supplied from a plurality of paths (for example, see Japanese Laid-open Patent Publication No. 2009-247990).

Such suction devices have a problem in that amounts of liquid supplied through the plurality of supply paths are likely to vary.

By contrast, the present invention is able to achieve a suction device and a suction system that are able to homogenize liquid supplied from a plurality of paths.

Figure 12:
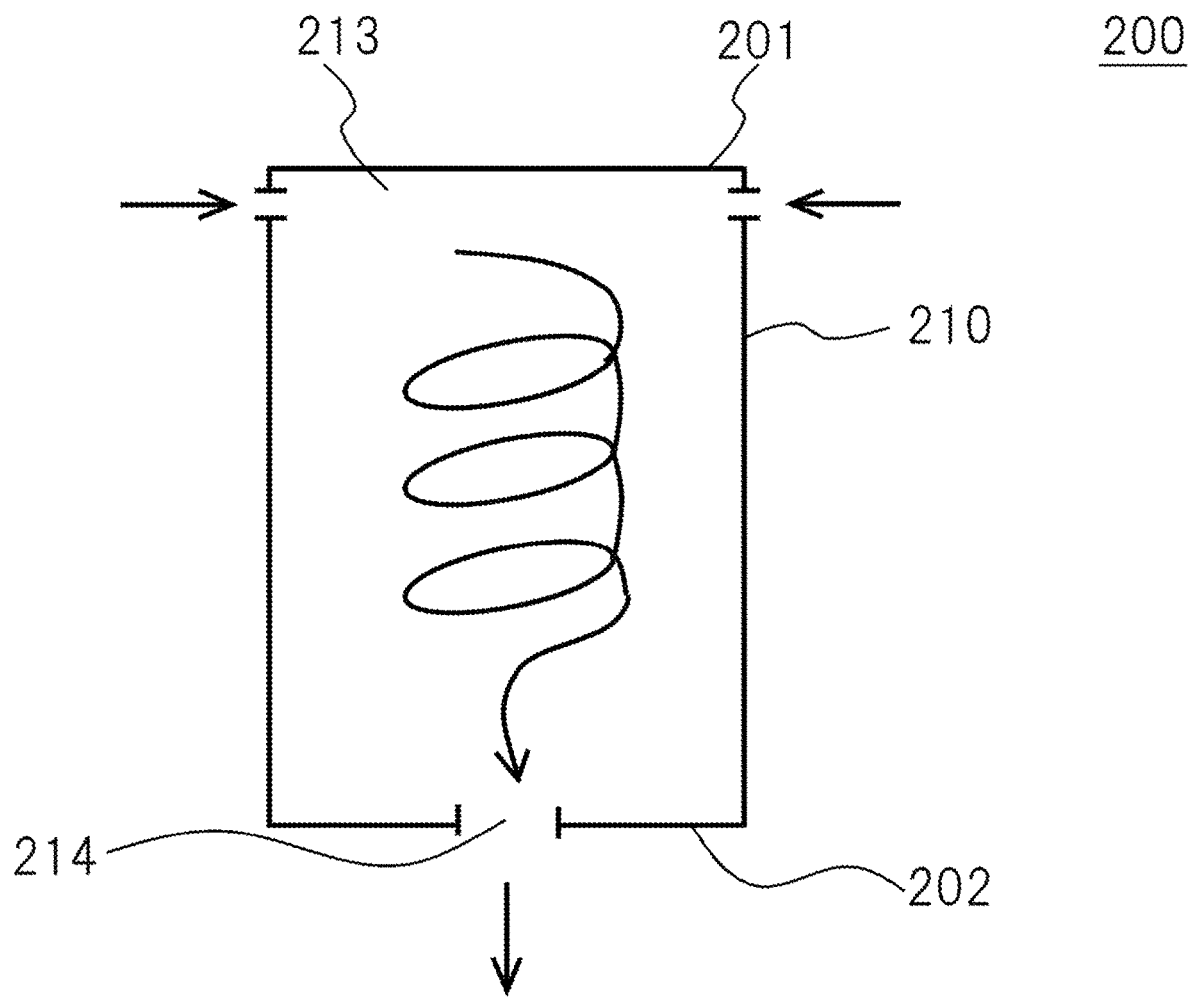
FIG. 12 is a schematic diagram illustrating a conceptual view of a suction device.
Figure 13:
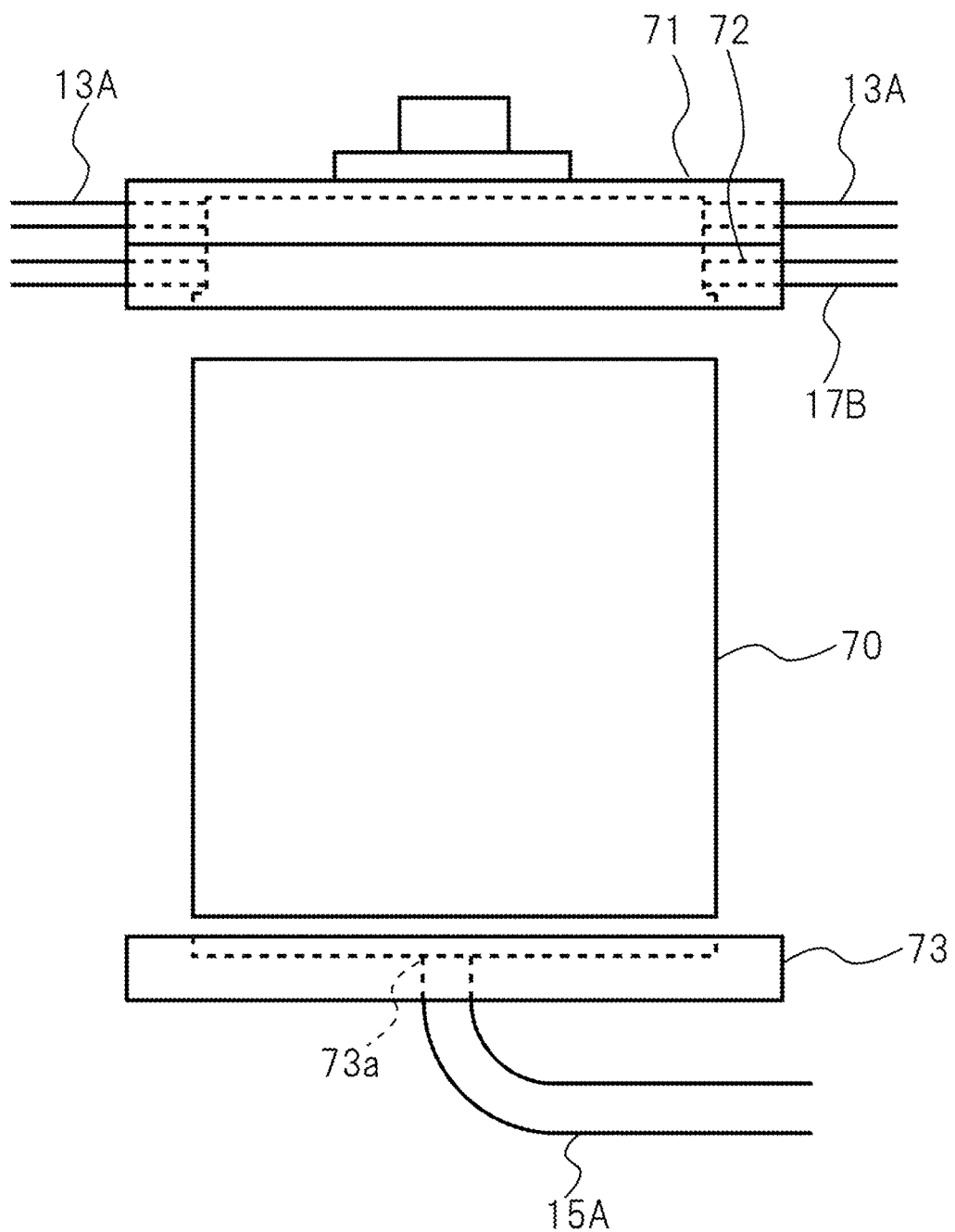
FIG. 13 is a transparent schematic diagram illustrating a configuration of a gas-liquid delivery unit.

As illustrated in FIG. 12 that conceptually depicts the present invention, a suction device 200 supplies medium liquid from introducing portions 213A and 213B provided at or in the vicinity of the first surface 201 in the cylindrical portion 210, and discharges the medium liquid from an outlet port 214 provided at or in the vicinity of the center of the second surface 202. That is to say, the medium liquid flows from the first surface 201 toward the second surface 202.

Thereby, it is possible to evenly mix the medium liquid supplied from the plurality of paths by swirling. In addition, the suction device 200 is a hermetically sealed system in which only the introducing portions 213 and the outlet port 214 are connected to the outside, does not have swings inside, and is designed to draw the medium liquid from the outlet port 214 side to the 213 side by using a negative pressure generated by a pump connected to the latter stage. At this time, the suction device 200 is able to cancel out the movement of the pump by the swirling of the medium liquid and to evenly draw the medium liquid from the plurality of introducing portions with equal force.

A suction device (gas-liquid delivery unit 15) of the present invention includes:

a cylindrical portion (cylindrical member 70) that has a cylinder with two base surfaces, a first surface (first surface 201) and a second surface (second surface 202), and that flows medium liquid supplied from a plurality of paths, from the first surface toward the second surface;

a plurality of introducing portions (exits of supply paths 71*a* to 71*d*) that introduce the medium liquid from the first surface or from the vicinity of the first surface into the cylindrical portion such that the medium liquid swirls inside the cylindrical portion; and an outlet port (outlet port 214) provided at or in the vicinity of the center of the second surface.

In this connection, in the gas-liquid delivery unit 15, a circular through-hole 72X is formed in a plate member 72. The through-hole 72X has a step portion formed in such a manner that its lower part closer to the cylindrical member 70 has a diameter slightly larger (by about 1 to 10 mm) than the diameter of the cylindrical member 70, and its upper part has a diameter slightly smaller (by about 1 to 10 mm) than the diameter of the cylindrical member 70. Therefore, the cylindrical member 70 is inserted in the step portion of the plate member 72. In addition, a circular concave portion 71X that communicates with the through-hole 72X is formed in the plate member 71. Therefore, the side portions of the through-hole 72X and concave portion 71X serve as part of the cylindrical portion 210, and the bottom surface of the concave portion 71X serves as the first surface 201. An outlet port 73a is formed at the center of the plate member 73.

A circular concave portion 73X is formed in the lower plate member 73, and the side surface of the concave portion 73X serves as part of the cylindrical portion 210 and the bottom of the concave portion 73X serves as the second surface 202.

The introducing portions introduce the medium liquid to the cylindrical portion along the outer wall of the cylindrical portion, so that the medium liquid swirls inside the cylindrical portion.

Thereby, the medium liquid flows along the cylindrical portion and creates a swirling flow using a force caused by the flow-in from the introducing portions.

The cylindrical portion is formed of a cylindrical member without base surfaces and a first and a second flange portion serving as the base surfaces, the introducing portions are holes that are provided in the first flange portion and that introduce the medium liquid tangentially to the cylindrical portion, and the outlet port is provided in the second flange portion and guides the medium liquid to the pipe provided in the latter stage.

Thereby, the suction device is manufactured with a simple assembly using flanges.

The outlet port (pipe 15A) has a cross-sectional area larger than the total cross-sectional area of the introducing portions (supply paths 71a to 71d). That is, the cross-sectional area of the outlet port 214 is preferably larger than the total cross-sectional area of the introducing portions 213 (213A and 213B).

Thereby, it is easy to keep negative pressure in the supply paths (pipe 13A and supply paths 71a to 71d connected to the previous stage of the introducing portions) up to the introducing portions 213. Even in the case where the pressure is unstable due to the supply of medium liquid from two electrolysis cells, the pressures from the two electrolysis cells can be easily balanced to be equal. In this connection, the cross-sectional area of the outlet port may be set larger than the total cross-sectional area of the introducing portions. Even in this case, it is possible to keep the negative pressure inside the suction device using the negative pressure generated by a pump provided in the latter stage.

Return ports (supply paths 72a and 72b) for returning part of medium liquid discharged from the outlet port are provided.

Thereby, it is possible to re-processing excessive medium liquid that is generated during the subsequent processing and to adjust the amount of discharge.

Provided are:

a plurality of first processing devices (electrolysis unit 13) for processing medium liquid, a second processing device (nanobubble generating unit 17) for processing medium liquid, and a suction device (gas-liquid delivery unit 15) provided between the first processing devices and the second processing device.

Thereby, it is possible to make the best use of the characteristic features of the suction device in which medium liquid supplied from the plurality of first processing devices is homogenized and supplied to the second processing device, and a balance in the pressure among the plurality of first processing devices is adjusted.

A return path for returning part of the medium liquid processed by the second processing device to the suction device is provided.

Thereby, it is possible to supply part of the medium liquid excessively generated in the second processing device again to a system that is formed from the suction device via the pump to the second processing device, in order to easily adjust the amount of discharge from the system. It is also possible to return the medium liquid back to the suction device according to a change in pressure in the second processing apparatus to thereby enable adjustment of the pressure, thus preventing pressure irregularities in the pump. Furthermore, it is possible to cumulatively process the medium liquid in the second processing device.

Further, a fine bubble generating apparatus of the present invention includes:

an electrolysis unit (electrolysis unit 13) that electrolyzes raw water to produce electrolyzed water and cracked gas (generated gas);

a gas-liquid delivery unit (gas-liquid delivery unit 15) that mixes the electrolyzed water and the cracked gas and delivers the mixed liquid;

a first pipe (pipe 13A) that supplies the mixed liquid from the electrolysis unit to the gas-liquid delivery unit in a hermetically sealed state;

a fine bubble generating unit (nanobubble generating unit 17) that generates fine bubbles in the mixed liquid supplied from the gas-liquid delivery unit, by physical collisions;

a second pipe (pipes 15A and 16A) that supplies the mixed liquid from the gas-liquid delivery unit to the fine bubble generating unit in the hermetically sealed state; and a pump (pump 16) that is provided in the second pipe and that pumps the mixed liquid to the fine bubble generating apparatus under pressure.

Thereby, it is possible to form a part from the electrolysis unit to the fine bubble generating unit as a hermetically sealed system and to perform appropriate pressure control on constitutional parts, such as applying a certain pressure to the fine bubble generating apparatus without applying high pressure to the electrolysis unit.

The pressure in the first pipe is negative pressure.

The negative pressure here refers to an average pressure value, covering temporary positive pressure.

Thereby, it is possible to minimize the risk of applying pressure to the diaphragm due to an increase in pressure in the electrolysis unit.

The pressure in the first pipe ranges from −15 to +15 kPa.

Thereby, it is possible to prevent excessively high pressure and to protect the electrolysis unit that is weak against high pressure. In this connection, this pressure refers to an average value, covering pressure temporarily off the above range. In the first pipe, it is preferable that the pressure keep its value close to zero (−5.0 to 5.0 kPa, more preferably −0.5 to +0.5 kPa) to decrease the influence on the electrolysis cell.

The pressure in the second pipe is positive pressure.

More specifically, the pressure in the second pipe preferably ranges from −15 to +15 kPa. In this connection, this pressure refers to an average value, covering pressure temporarily off this value range. The average value preferably keeps a positive pressure value (0.0 to 15.0 kPa, more preferably, 2.0 to 10.0 kPa). This value range is especially for the pipe (pipe 15A) positioned in the previous stage of the pump, and a higher value range is preferably applied to the pipe (pipe 16A) provided in the latter stage of the pump. In this connection, it was confirmed that, in an actual fine bubble generating apparatus, the pressure in the first pipe (pipe 13A) was 0.0 kPa, and the pressure in the second pipe (pipe 15A) was 6.0 kPa. This proves that the pressure transmission is blocked under good conditions by a swirling flow in the gas-liquid delivery unit 15.

The gas-liquid delivery unit generates a vortex flow by high-speed swirling.

Thereby, it is possible to block pressure transmission between the fine bubble generating apparatus located in the latter stage and the electrolysis unit located in the previous stage, and such a configuration is achieved as to apply high pressure to the fine bubble generating apparatus located in the latter stage and not to apply high pressure to the electrolysis unit located in the previous stage.

The electrolysis unit includes a plurality of electrolysis cells, and the gas-liquid delivery unit mixes the electrolyzed water and the cracked gas supplied from the plurality of electrolysis cells and delivers the mixed liquid.

Thereby, the gas-liquid delivery unit is able to absorb the pressure difference occurring among the plurality of electrolysis cells and send the electrolyzed water and cracked gas from the plurality of electrolysis cells at almost equal pressure, thereby minimizing the risk of causing problems, such as a pressure temporarily concentrated on one electrolysis cells.

The plurality of electrolysis cells have a plurality of outlet ports, and the gas-liquid delivery unit takes in mixed liquid supplied from the plurality of outlet ports, from corresponding supply ports. Thereby, it is possible to distribute the pressure, thereby minimizing the risk of a temporary increase in the pressure.

Other Embodiments

The above embodiments have described the case where nanobubbles are generated with high-speed swirling. The present invention is not limited thereto and does not necessarily need the high-speed swirling. For example, fine bubbles may be generated by physical collisions by causing medium liquid to meander plural times.

Further, the above embodiments have described the case where one electrolysis cell is used as the electrolysis unit 13, but two or more electrolysis cells may be used. In this case, mixed water (generated gas and electrolyzed water) is supplied through a plurality of paths (pipes) to the gas-liquid delivery unit 15. At this time, the gas-liquid delivery unit 15 takes a role of evenly mixing the mixed liquid produced by the plurality of electrolysis cells.

Still further, the above embodiments have described the case where the cathode compartment 52 is cleaned, but the cleaning is not always necessary. In this case, a process of filling the circulation tank 63 with raw water and then discarding may be performed once, more preferably plural times.

Still further, the above embodiments have described the case where a mixture of generated gas and mixed gas is used. In the case where an external tank for storing bubble electrolyzed water is externally provided, gas including chloric gas accumulated in the upper part of the external tank may be supplied as the mixed gas. This makes it possible to increase the concentration of chlorine in the mixed water.

Still further, the above embodiments have described the case where fine bubble liquid is produced in a so-called continuous mode in which medium liquid is supplied to the nanobubble generating unit 7 and then discharged from the bubble electrolyzed water supply unit 18. Alternatively, fine bubble liquid may be produced in a so-called batch mode in which medium liquid and fine bubble liquid are stored in a liquid storage tank and are circulated over a fixed period of time in the nanobubble generating unit 7. In addition, a storage tank for storing fine bubble water may be provided in the latter stage of the bubble electrolyzed water supply unit 18.

Still further, the above embodiments have described the case where the gas-liquid delivery unit 15 performs high-speed swirling in one direction for high-speed stirring. This invention is not limited to thereto. For example, the high-speed stirring may be achieved by causing turbulence or rotating wings.

Still further, the above embodiments have described the case where nanobubbles are generated at room temperature, and water temperature is not particularly adjusted. Since the solubility of gas increases with decreasing liquid temperature, a cooling function may additionally be provided for lowering the liquid temperature.

Still further, the above embodiments have described the case of providing the bubble electrolyzed water generating apparatus 10 as a fine bubble generating apparatus, the gas-liquid delivery unit 15 as a gas-liquid delivery unit, the pipe 15A as a first pipe, the pump 16 as a pump, the pipe 16A as a second pipe, and the nanobubble generating unit 17 as a fine bubble generating unit. The present invention is not limited thereto, and the fine bubble generating apparatus of the invention may be configured with a fine bubble generating apparatus, a gas-liquid delivery unit, a first pipe, a pump, a second pipe, and a fine bubble generating unit that have another configuration.

INDUSTRIAL APPLICABILITY

The present invention is applicable to a nanobubble generating apparatus for producing nanobubble water containing nanobubbles and a bubble electrolyzed water generating apparatus for producing bubble electrolyzed water, for example.

REFERENCE SIGNS LIST

1: Fine bubble generating apparatus
3: Medium liquid supply unit
3A, 5A, 6A, 7A: Pipe
4: Gas supply unit
5: Gas-liquid delivery unit
6: Pump
7: Nanobubble generating unit
8: Fine bubble water supply unit
10: Bubble electrolyzed water generating apparatus
11: Raw water supply unit
12: Electrolyte supply unit
13: Electrolysis unit
13A, 15A, 16A, 17A, 17B: Pipe 14: Gas supply unit
15: Gas-liquid delivery unit
16: Pump
17: Nanobubble generating unit
18: Bubble electrolyzed water supply unit
70: Cylindrical member
71 to 73: Plate member
71a to 71d, 72a to 72b: Supply path
RT1: Bubble electrolyzed water generation process

The invention claimed is:

1. A fine bubble generating apparatus comprising:
an electrolysis unit that electrolyzes raw water to produce electrolyzed water and cracked gas;
a gas-liquid delivery unit that mixes the electrolyzed water and the cracked gas and delivers mixed liquid;
a first pipe that supplies the electrolyzed water and the cracked gas from the electrolysis unit to the gas-liquid delivery unit in a hermetically sealed state;
a fine bubble generating unit that generates fine bubbles in the mixed liquid supplied from the gas-liquid delivery unit, by physical collisions;
a second pipe that supplies the mixed liquid from the gas-liquid delivery unit to the fine bubble generating unit in the hermetically sealed state; and
a pump that is provided in the second pipe and that pumps the mixed liquid to the fine bubble generating unit under pressure,
wherein the electrolysis unit, the gas-liquid delivery unit, the first pipe, the fine bubble generating unit, the second pipe and the pump form a hermetically sealed system,
wherein the gas-liquid delivery unit blocks transmission of the pressure from the pump to the electrolysis unit, and
wherein the electrolysis unit comprises at least three compartments separated by diaphragms.

2. The fine bubble generating apparatus according to claim 1, wherein pressure in the first pipe is negative pressure.

3. The fine bubble generating apparatus according to claim 1, wherein pressure in the first pipe ranges from −15 kPa to 15 kPa.

4. The fine bubble generating apparatus according to claim 1, wherein pressure in the second pipe is positive pressure.

5. The fine bubble generating apparatus according to claim 1, wherein pressure in the second pipe ranges from −15 kPa to 15 kPa.

6. The fine bubble generating apparatus according to claim 1, wherein the gas-liquid delivery unit generates a vortex flow by high-speed swirling.

7. The fine bubble generating apparatus according to claim 1, wherein:
the electrolysis unit includes a plurality of electrolysis cells; and the gas-liquid delivery unit mixes the electrolyzed water and the cracked gas supplied from the plurality of electrolysis cells and delivers the mixed liquid.

8. The fine bubble generating apparatus according to claim 1,
wherein:
the gas-liquid delivery unit includes
a cylinder that has, a first base surface and a second base surface opposite from the first base surface, and that causes medium liquid supplied from a plurality of paths to flow from the first base surface toward the second base surface,
a plurality of introducing portions that introduce the medium liquid from the first base surface or from vicinity of the first base surface into the cylinder such that the medium liquid swirls inside the cylinder, and
an outlet port provided at or in vicinity of a center of the second base surface.

9. The fine bubble generating apparatus according to claim 7,
wherein the gas-liquid delivery unit blocks transmission of the pressure from the pump to the electrolysis unit to prevent damage to the plurality of electrolysis cells of the electrolysis unit.

* * * * *